United States Patent Office 3,389,095
Patented June 18, 1968

3,389,095
PROCESS FOR STABILIZING PHENOLIC FOAM WITH ALKYLENE OXIDE AND PRODUCT OBTAINED THEREFROM
Walter L. Garrett, Freeland, Mich., assignor to The Dow Chemical Company, Midland, Mich., a corporation of Delaware
No Drawing. Filed Dec. 16, 1963, Ser. No. 330,658
13 Claims. (Cl. 260—2.5)

This invention relates to a process for stabilizing phenolic foam and to the phenolic foam prepared thereby. More particularly, it concerns alkylene oxide treatment of a phenolic foam prepared with an aromatic sulfonic acid catalyst to give a stable light-colored phenolic foam having improved flexibility and resilience.

Rigid phenolic foams are conventionally prepared from suitable liquid phenol-aldehyde resins by incorporating a blowing agent and an acidic catalyst and then heating the mixture to obtain a solid, thermoset phenolic foam. Such phenolic foams are suitable for foaming-in-place applications, stable at high temperatures, and self-extinguishing. In spite of such desirable properties, commercial use of these phenolic foams has been hampered by poor flexibility, resiliency and color, by low cohesive strength, and by brittleness and friability.

Numerous materials have been examined as additives to improve the physical properties of the cured phenolic foams. However, the process described herein involving the combination of a particular catalyst and a subsequent treatment with an alkylene oxide to give a stable phenolic foam having improved properties has not been previously known or described.

More particularly it has been discovered that when a strong organic acid comprising at least 30 mole percent of an aromatic sulfonic acid is employed as the catalyst in a phenolic foam formulation, curing of the foam occurs in several distinct although overlapping stages. The initial foam product is essentially colorless and is moderately resilient and flexible for a period which may range from about an hour at room temperature to several months or more at temperatures below about 0° C. The stabilization achieved by rapid cooling to below 0° C. is, however, only temporary for when the product is warmed to room temperature further curing occurs. After about one hour at room temperature, discoloration of the phenolic foam becomes evident as a pink cast which progressively darkens to a deep red-brown. Concurrently the resiliency and flexibility of the foam decreases and the product becomes brittle and very friable.

It has further been found that by reaction of the phenolic foam while in the more resilient form with sufficient $C_2$-$C_4$ alkylene oxide to oxyalkylate the residual phenolic groups, effective stabilization of the foam in the more resilient form is achieved. The resulting stabilized phenolic foam remains essentially colorless, resilient, flexible and non-friable for prolonged periods under normal conditions of use. This chemically stabilized more resilient phenolic foam is particularly desirable for use as board stock, wall panels and roofing materials because of its increased durability and its fire-resistant properties.

PREPARATION OF THE PHENOLIC FOAM

In the practice of the present invention, any water-insoluble, liquid, thermosetting phenol-aldehyde resin may be employed. Such resins are generally prepared by condensation of one mole of a monohydric phenol with between 1.0 and 2.5 and preferably between 1.40 and 1.50 moles of formaldehyde until a water-insoluble, liquid condensation product is obtained. Conveniently the condensation is initiated under alkaline conditions with a reaction temperature of 40°–70° C. Then when the polymer solution has a room temperature viscosity of about 20–30 c.p.s. it is acidified and polymerization continued until the desired water-insoluble, liquid resole resin is obtained. Although phenol is a preferred reactant, moderate amounts of other monohydric phenols having at least one reactive aromatic position may also be incorporated in these resole resins.

In preparing the improved phenolic foams described herein, it is preferable to use a water-insoluble, liquid phenolic resole resin having a room temperature viscosity of from about 250 to 500 c.p.s. However, liquid phenolic resole resins having a normal viscosity in the range from about 200 to 1,000 c.p.s. or more are satisfactory. Small amounts of residual water in the resole resin generally are not detrimental, but if necessary can be reduced by such means as distillation under reduced pressure.

It is well recognized that careful formulation is required in the preparation of foam products. Besides the liquid phenol resole resin, other essential ingredients are the blowing agent and an acidic catalyst to cure or harden the foamed polymer. Other additives such as inert fillers, silicon fluids to control cell structure, etc., can also be incorporated into foam formulations by the usual techniques with suitable care to maintain the proper balance of physical and chemical properties needed for foaming.

In the present process such blowing agents as steam, carbon dioxide or nitrogen formed in situ by chemical or thermal action can be used. However, low boiling liquids, such as aliphatic hydrocarbons, fluorocarbons or ethers having a boiling point in the range from about 20°–100° C. are preferred, particularly in making low density foams.

Essential to this invention is the use of a strong organic acid comprising at least 30 mole percent of an aromatic sulfonic acid as the catalyst to promote further condensation of the polymer. The usual inorganic acid catalysts, such as hydrochloric acid, sulfuric acid, phosphoric acid, are too active and may cause the polymer to become thermoset before the desired foaming occurs. Hence strong organic acids such as formic acid, oxalic acid, trichloroacetic acid, toluenesulfonic acids, methanesulfonic acid, etc., are required. But to obtain the desired more resilient phenolic foam, an aromatic sulfonic acid is essential. Particularly suitable are the toluenesulfonic acids, 2-naphthalenesulfonic acid, and mixture of these sulfonic acids with trichloroacetic acid. Usually a catalyst concentration of about 2–5 weight percent based on the liquid resole resin is adequate. However, more exact formulations for a particular resin are easily determined by those skilled in the art by routine tests.

To obtain the phenolic foam conventional techniques are used. The necessary ingredients in the desired proportions are rapidly and thoroughly intermixed and then treated as required to achieve foaming. For example, a formulation containing p-toluenesulfonic acid as catalyst and a fluorocarbon having a boiling point of 47.6° C. is foamed by heating the mixture briefly at a temperature in the range from about 50° to 100° C. In some cases the exothermic reaction of the resole resin and catalyst is sufficient to initiate foaming. Maximum foam height is usually obtained in about 1 to 2 minutes after foaming begins and the solid foam product is adequately cured for handling a few minutes thereafter. The foam prepared with an aromatic sulfonic acid catalyst is white in color and has considerable resiliency and flexibility. However, unless it is rapidly stabilized in some manner, these properties deteriorate as curing continues to give a highly colored, brittle and friable foam.

STABILIZATION BY TREATMENT WITH ALKYLENE OXIDE

The invention disclosed herein relates to a process for the preparation of improved phenolic foams from a liquid phenol-formaldehyde resin by incorporating therewith a low boiling blowing agent and an aromatic sulfonic acid catalyst, treating the resulting mixture to form a solid resilient and flexible phenolic foam, and then stabilizing the phenolic foam in this more resilient form by reacting with at least one mole of a $C_2$–$C_4$ alkylene oxide per equivalent of residual phenolic groups whereby these phenolic groups are oxyalklated. It has been found that by treating the phenolic foam while it is in the more resilient form with an alkylene oxide as described, subsequent embrittlement can be largely eliminated and a stable phenolic foam having most desirable properties is obtained.

To retain maximum resiliency, the phenolic foam should be stabilized as soon as possible after reaching maximum foam height and becoming a thermoset solid foam. Generally phenolic foams are sufficiently thermoset to be handled within a few minutes after achieving maximum foam height. By rapidly cooling the foam to room temperature or below, the rate of further curing is decreased and considerable resiliency and flexibility are usually retained if the stabilization with an alkylene oxide is initiated within an hour of the initial foam formation.

Stabilization by oxyalkylation of the free phenolic hidroxyl groups is achieved in the presence of an alkaline catalyst. It is well known that under alkaline conditions, alkylene oxides react rapidly and preferentially with the phenolic hydroxyl groups of a phenolic resin. Obviously to achieve rapid reaction throughout the phenolic foam both the alkylene oxide and basic catalyst should preferably be in gaseous form under the reaction conditions. Because of their reactivity and volatility, ethylene and propylene oxides are preferred, but $C_4$ 1,2-alkylene oxides can also be used.

Particularly suitable as catalysts for the oxyalkylation are gaseous nitrogen bases such as ammonia, methylamine, trimethylamine and similar materials. Sufficient base must be used to neutralize the acidic catalyst and to make the foam alkaline as determined with moist pH paper or other conventional means. Neutralization of the acidic catalyst alone does not result in the desired stabilization of the phenolic foam. Further curing continues even under neutral or alkaline conditions.

The mechanism whereby the phenolic foam is stabilized clearly involves chemical modification of the polymer by oxyalkylation of residual phenolic hydroxyl groups. While the detailed reactions involved in the curing of a phenolic resin are not fully known, a free phenolic group seems essential. For example, it was found that a liquid phenolic resole resin modified by oxyalkylation prior to curing and then treated with the usual acidic catalysts cured only slowly. There is evidence that when an aromatic sulfonic acid is used as catalyst, the initial polymer contains predominately benzyl ether structures which then more slowly rearrange to less flexible methylene-bridge structures as indicated in simplified linear form:

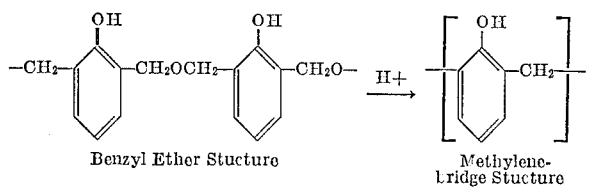

Benzyl Ether Stucture     Methylene-bridge Stucture

Oxyalkylation of the phenolic groups apparently stabilizes the phenolic foam in the more resilient form by preventing further condensation and rearrangement to the methylene-bridge structure.

To stabilize the phenolic foam by oxyalkylation, treatment with at least one mole of alkylene oxide per equivalent of residual phenolic groups is required. In practice essentially complete oxyalkylation of the residual phenolic groups has been obtained using a 10–20 percent excess of alkylene oxide calculated assuming a minimum equivalent weight for the solid phenolic foam of 106, i.e., that of a linear methylene-bridge polymer. While the actual equivalent weight is both greater than 106 and variable, this basis assures sufficient alkylene oxide without requiring phenolic hydroxyl analyses. At times two or more moles of alkylene oxide are used to insure rapid oxyalkylation. Excess oxide beyond that required to oxyalkylate the phenolic groups reacts more slowly with the glycol ether or methylol substituents. Since these latter reactions may cause undesirable increases in foam density or loss of such important properties as fire-resistance, prolonged reaction of the phenolic foam with a large excess of alkylene oxide is often undesirable.

In practice it is generally desirable to remove the outer foam skin before the stabilization treatment to permit more rapid penetration of the foam by the basic catalyst and the alkylene oxide. Then after treating the phenolic foam with sufficient base to neutralize the acidic curing catalyst and to make the foam alkaline, the desired amount of alkylene oxide is added. Although oxyalkylation of the phenolic groups occurs readily at temperatures ranging from about 20° to 100° C., a temperature near or above the boiling point of the oxide is preferred to provide a high vapor concentration of oxide. The time required for oxyalkylation may range from about 0.1 to 10 hours or more depending particularly on the amount of excess oxide and the reaction temperature. For maximum stability the treated phenolic foam is usually washed with water or dilute acid to remove unreacted oxide and give a neutralized product.

In summary, this invention relates to the preparation of an improved more resilient phenolic foam from a liquid phenolic resole resin by employing as the acidic catalyst in the foam formulation a strong organic acid comprising at least 30 mole percent of an aromatic acid and subsequently stabilizing the foam in the more resilient form by oxyalkylation of the residual phenolic groups with a $C_2$–$C_4$ alkylene oxide. Within the general scope of the invention described herein, optimum reaction conditions for particular formulations can be determined by those skilled in the art in a routine manner.

In order that those skilled in the art may better understand the present invention, the following examples are given by way of illustration without limitation of the invention thereto. Unless otherwise stated, all parts and percentages are by weight.

Example 1.—Liquid phenol-formaldehyde resole resin

To a mixture of 941 parts (10 moles) of phenol and 1150 parts (14.2 moles) of 37% aqueous formaldehyde heated to about 45° C. was added 26.3 parts (0.66 mole) of sodium hydroxide. Then over a period of about an hour the temperature of the reaction mixture was increased to 60°–65° C. where it was held for another 4 hours before cooling. The resulting aqueous polymer solution had a room temperature viscosity of about 20 cps. Then to the stirred polymer solution at about room temperature was slowly added 213 parts (0.65 mole) of 30% sulfuric acid. Polymerization was continued for 3 to 4 hours at about 40° C. until a viscous water-insoluble, liquid phenolic resole resin was obtained. After separating from the aqueous phase, the resole resin was neutralized with dilute caustic to a pH between 5 and 7 and then washed thoroughly with water. The resulting water-insoluble, liquid resole resin had a room temperature viscosity between about 250 and 500 cps. and contained less than 5–10% residual water.

5

Example 2.—Preparation of phenolic foam

The following standard phenolic foam formulation was employed:

| | Parts |
|---|---|
| Liquid phenol-formaldehyde resole resin as described in Example 1 | 180 |
| 1,1,2-trichloro-1,2,2-trifluoroethane (Freon 113 from Du Pont) | 20 |
| An equimolar mixture of p-toluenesulfonic acid and trichloroacetic acid as a 60% solution in water or diethylene glycol | 16 |

In some instances 20 parts of a diethylene glycol dispersion containing 20 to 25 wt. percent of a copolymer of 3 parts of 1,3-butadiene and 1 part of acrylamide was added to the formulation as further described in the U.S. Patent application, Ser. No. 321,295, filed by W. L. Garrett on Nov. 4, 1963. However, the presence of this added component in the formulation is not essential and does not affect the post treatment of the foam with alkylene oxide.

In a typical run, the ingredients were added in the above proportions to a suitable container, vigorously mixed at room temperature for a few moments, poured into a foaming pan and then heated in an oven held at about 85° C. Maximum foam rise occurred in less than 10 minutes and the resulting solid phenolic foam was initally white, resilient and non-friable. Continued heating in the oven at about 85° C. For an hour gave a rigid foam having markedly reduced flexibility and resiliency as well as increased brittleness and noticeable discoloration. Foams prepared in this manner without the copolymer additive have a density of about 6.0 lbs./ft.$^3$ and a displacement flexibility of about 0.2 inch. Under similar conditions but with the added butadiene-acrylamide copolymer typical densities of about 2.1 lbs./ft.$^3$ and displacement flexibilities of about 0.3 inch are obtained.

As a measure of the foam flexibility, test specimens measuring about ⅜ x ⅜ x 1½ inches were treated as follows. Each test specimen was individually clamped in a holder so that 1.0 inch of the piece projected beyond the edge of the clamp. Then the tip of the free end of the test specimen was slowly deflected in a direction perpendicular to the length of the piece until the sample broke. The average deflection of the tip at the time of the break as determined with several test pieces is then an indication of the flexibility of the foam.

Example 3.—Stabilization with ethylene oxide

A. A sample of more resilient phenolic foam was prepared as described in Example 2 using as the catalyst a similar amount of an equimolar mixture of 2-naphthalenesulfonic acid and trichloroacetic acid. The butadiene-acrylamide copolymer was also added. The foam was removed from the curing oven about 5 minutes after reaching maximum foam height and was immediately cut into pieces about 1 x 3 x 3 inches in size, each weight about 5 g. Three samples (3–1, 3–2 and 3—3) were individually weighed and placed in separate containers. Samples 3–2 and 3—3 were immediately treated with sufficient anhydrous trimethylamine to neutralize the acid catalyst and give a foam having a pH between about 8.0 and 11.0 as determined with moist pH paper. To the container with Sample 3–2 was added 0.8 g. of ethylene oxide (EO) per g. of foam (a minimum of 2 equivalents of EO/residual phenolic OH). Similarly to Sample 3—3 was added 1.6 g. of ethylene oxide per g. of foam (about 4.0 equivalents of EO). Sample 3–1 was used as a control and was neither neutralized nor treated with ethylene oxide. The three separate samples were then quickly transferred to an oven and heated at about 90° C. for an hour.

When taken from the oven the control Sample 3–1 was bright pink in color while the stabilized Samples 3–2

6 and 3—3 remained colorless. Furthermore Sample 3A was markedly less resilient and flexible, more brittle and friable than the stabilized samples. The stabilized samples showed no residual phenolic OH when examined by infrared techniques. The compressive strength of each sample was determined by the general procedure described in ASTM Test D1621–59T with results as given in Table 1.

TABLE 1.—COMPRESSIVE STRENGTH

| Sample | Stabilization Treatment | Load at 10% Compression (p.s,i.) | Yield Point (p,s,i.) |
|---|---|---|---|
| 3–1 | None (control) | ($^1$) | 13 |
| 3–2 | Neutralization+2 EO | 12 | None |
| 3–2 | Neutralization+4 EO | 12 | None |

$^1$ Yield point reached before 10% compression.

B. In another similar test it was found that phenolic foam stabilized by oxyalkylation with ethylene oxide was essentially unchanged after heating overnight in an air oven at 110–120° C. while the same foam without treatment became brown in less than a half-hour and was extremely dark in color, fragile and brittle after 16 hours.

C. Using other test pieces cut from a bun of resilient phenolic foam similar to that described in 3A, it was found that at room temperature the flexibility of an untreated sample decreased to a minimum value in less than 4 days. A piece neutralized by treatment with ammonia became quite yellow in color and reached essentially the same minimum flexibility in about 4 weeks. In contrast, a piece stabilized by treatment with ethylene oxide showed essentially no change in color, resiliency or flexibility after more than 4 months of exposure to light and air at room temperature.

Example 4.—Stabilization with other alkylene oxides

In other experiments, phenolic foams have been stabilized in the more flexible and resilient form by treatment similar to that described in Example 3A using at least one equivalent of a $C_3$–$C_4$ alkylene oxide. Typically a phenolic foam in the intermediate more resilient form was treated with trimethylamine to a pH of about 9.5. After adding about 1.2 equivalents of propylene oxide based on the sample weight, the foam was left in a closed container for about 60 hours. Then is was washed with dilute acetic acid and air dried. A sample of this foam was essentially unchanged in color, resiliency, and other physical properties after heating overnight at 110° C. In contrast, the untreated control sample was dark brown, brittle, and extremely friable.

Example 5.—Friability

As a test of the relative friability of the untreated and the stabilized phenolic foam, 1.5 inch diameter discs of each foam were abraded with fine carborundum paper mounted on a 2 inch diameter sanding wheel revolving in a plane parallel to the surface of the foam and held in firm contact with the foam disc. With foam samples essentially the same as 3–1 and 3–2, 7 seconds were required to remove a 0.25 inch surface from the disc of the untreated foam compared with 15 seconds for the foam stabilized by oxyethylation.

I claim:
1. In a process for the preparation of a solid phenolic foam from a composition comprising a liquid phenol-formaldehyde resole resin, a blowing agent and an acidic catalyst, the improvement which consists of:
  (A) adding to the liquid resole resin as the acidic catalyst a strong organic acid comprising at least 30 mole percent of an aromatic sulfonic acid,
  (B) holding the liquid resin composition at a temperature in the range from about 20° to 100° C. for a time sufficient to form a solid resilient phenolic foam,
  (C) treating the phenolic foam while in the resilient form with a sufficient amount of a gaseous nitrogen base to make the foam alkaline, and

(D) oxyalkylating the residual phenolic OH groups of the alkaline foam with a $C_2$–$C_4$ alkylene oxide.

2. The process of claim 1 wherein the acidic catalyst is p-toluenesulfonic acid.

3. The process of claim 1 wherein the acidic catalyst is a mixture of p-toluenesulfonic acid and trichloroacetic acid.

4. The process of claim 1 wherein the acidic catalyst is a mixture of 2-naphthalenesulfonic acid and trichloroacetic acid.

5. The process of claim 1 wherein the alkylene oxide is ethylene oxide.

6. The process of claim 1 wherein the alkylene oxide is propylene oxide.

7. The process of claim 1 wherein the blowing agent is a fluorocarbon having a boiling point in the range from about 20° to 100° C.

8. An improved phenolic foam prepared from a composition comprising a liquid phenol-formaldehyde resole resin, a fluorocarbon blowing agent and a strong organic acid catalyst containing at least 30 mole percent of an aromatic sulfonic acid wherein the residual phenolic OH groups of phenolic foam have been oxyalkylated with a $C_2$–$C_4$ alkylene oxide said foam being prepared by the process of claim 1.

9. The product of claim 8 wherein the acidic catalyst is p-toluenesulfonic acid.

10. The product of claim 8 wherein the acidic catalyst is a mixture of p-toluenesulfonic acid and trichloroacetic acid.

11. The product of claim 8 wherein the acidic catalyst is a mixture of 2-naphthalenesulfonic acid and trichloroacetic acid.

12. The product of claim 8 wherein the alkylene oxide is ethylene oxide.

13. The product of claim 8 wherein the alkylene oxide is propylene oxide.

References Cited

UNITED STATES PATENTS

| | | | |
|---|---|---|---|
| 2,629,706 | 2/1953 | Grotte et al. | 260—53 |
| 2,933,461 | 3/1960 | Mullen | 260—2.5 |
| 3,038,881 | 6/1962 | Groote | 260—53 |

FOREIGN PATENTS

| | | |
|---|---|---|
| 937,855 | 8/1963 | Great Britain. |

MURRAY TILLMAN, *Primary Examiner.*

M. FOELAK, N. F. OBLON, *Assistant Examiners.*